Patented May 27, 1941

2,243,658

UNITED STATES PATENT OFFICE 2,243,658

LOW TEMPERATURE ACTIVE POLYMERIZATION CATALYST

Robert M. Thomas, Union, and Ober C. Slotterbeck, Elizabeth, N. J., assignors to Standard Oil Development Company, a corporation of Delaware No Drawing. Application October 2, 1937, Serial No. 167,024

13 Claims. (Cl. 260—94)

The present invention relates to the art of producing valuable polymers from low boiling olefins, and more specifically from iso-olefins such as isobutylene, iso-amylene and the like. The invention will be fully understood from the following description.

It is known that olefins, including iso-olefins such as isobutylene, are polymerized by means of aluminum chloride, boron fluoride and the like, and it is likewise recognized that the use of these catalysts at low temperatures, for example below —20° C., results in the formation of linear polymers of relatively high molecular weight, for example, in excess of 800. The most useful catalyst heretofore has been boron fluoride, a gas, and the chief objection to the more powerful solid catalysts such as aluminum chloride has been that they are very slightly soluble in the olefin at low temperatures. For this reason when working at moderately low temperatures, the solid rapidly becomes coated with the gummy polymer and although this can be removed slowly, the polymerization is not entirely satisfactory and the valuable, extremely high molecular weight products are not produced. Furthermore, at extremely low temperatures such as —103° C. little polymerization is noted.

There have been attempts to remedy the aforesaid difficulties with the solid catalysts by dissolving them in solvents, but it has been found that very few indeed are satisfactory for the purpose. In some instances the solvent apparently unites with the active metal halide to form a complex which is totally inactive at the low temperatures desired for the polymerization procedure. This is the situation with ethyl ether, benzoyl chloride, chlor benzenes, pyridine, and similar solvents. In many other cases the solution, or complex if that is formed, is found to have a relatively high melting point so that it becomes solid and inactive before low temperatures such as —20° C., —50° C., or —100° C., which low temperatures are absolutely necessary to produce the high grade products, can be reached. This situation is found to exist with such solvents as nitroparaffins and nitroaromatic hydrocarbons. In still other media such as liquid propane, butane and ethylene, where no complex apparently is formed, the solid catalysts are substantially insoluble so that only very low concentrations can be obtained and for this reason the higher polymers cannot be produced. Still other products such as aromatic hydrocarbons are found to be specific poisons for the polymerization of the olefins and for this reason they are, of course, undesirable.

For the reasons given above, the number of solvents that can be used in order to work at temperatures below —50° or —70° C. or —100° C. is extremely limited. It has been found, however, that certain solvents can be used with great advantage. These solvents comprise the alkyl halides, preferably those having less than five carbon atoms, and especially those having at least one active hydrogen atom in the molecule. The mono halides are to be preferred, but it will be understood that di and even tri-halides can be employed so long as there is at least one free hydrogen atom. Of the various halides, the methyl and ethyl chlorides, bromides and iodides are to be preferred but of these the chlorides are the best not only because of their greater availability and cheapness but also of the increased stability of the solvent, greater solvent power and especially the lower melting point for the solution obtained.

The liquid catalyst is in many ways more satisfactory than gaseous boron fluoride, first, because the amount of the catalyst can be more accurately controlled and, secondly, because it does not readily escape from the reaction vessel, and, thirdly, when desired it can be employed in relatively high concentrations.

In carrying out the polymerization, the olefins, of which isobutylene is the best example, are liquefied and cooled to the polymerization temperature, for example any temperature below —20° C. The lower the temperature, other things being the same, the higher will be the molecular weight of the product. The catalyst is made up by dissolving the active metal halide in an alkyl halide solvent, for example aluminum chloride in ethyl chloride, at a temperature preferably well below room temperature. The solution is preferably prepared below 0° C. The catalyst solution is best employed in concentrations of 0.1% to 2% and possibly more of the metal halide, and is preferably precooled to the reaction temperature desired prior to use, for example, by further dilution with an equal volume of liquid ethylene where the reaction is to be carried out at a temperature in the neighborhood of —100° C. The amount of catalyst in solution added to the liquefied olefin to be polymerized may vary from approximately 0.01% to 2.0% depending upon the conditions employed for reaction. Provision should be made to rapidly withdraw heat of reaction and thus to maintain the low temperature during the entire polymerization period. This can be accomplished by external cooling or by the addition of an internal refrigerant, such as solid carbon dioxide or by the addition of a low boiling liquefied hydrocarbon, preferably one which is entirely inert under the conditions. Examples of such diluents are propane, butane or their mixtures which may include ethane or ethylene. By suitably adjusting the composition of the refrigerant, the polymerization vessel may be held at any suitable temperature by allowing the solvent to evaporate at a pre-determined pressure fixed for that purpose. In this way an active control of temperature is maintained.

When the reaction is completed, the material is allowed to gradually rise to room temperature and water may be added to hydrolyze the catalytic material which precipitates as the metal hydroxide. The polymer may be dissolved in a light or heavy naphtha or other suitable solvent and the hydrolyzation products of the catalyst removed by filtration or other mechanical means. In order to recover the polymer, the solvent is simply distilled.

Aluminum chloride is the best of the solid anhydrous halides of the active type useful for this purpose, but the bromide and iodide may also be used. Fluorides are less desirable because of a much lower solubility. Similarly, other metal halides may be used, as well as the other less common members of the general class of the solid Friedel-Crafts catalysts.

Example I (a) 10 grams of pure isobutylene in a liquid state were added to 20 grams of liquefied ethylene and the mixture allowed to boil at a temperature of approximately —100° C. One gram of solid aluminum chloride was added to this solution but no reaction resulted.

(b) The experiment was repeated using as the catalyst, solutions of aluminum chloride in diethyl ether, pyridine, benzoyl chloride and trichlorbenzene respectively. No reaction resulted.

Example II

Using aluminum chloride dissolved in nitro methane as the catalyst, a polymerization of isobutylene was obtained at a temperature of —6° C., but a polymer of low molecular weight resulted. When the temperature was decreased to —45° C., in order to obtain an improved polymer of higher molecular weight, it was found that the catalyst complex had solidified completely and no reaction resulted.

Example III

To 10 grams of liquefied isobutylene, 10 grams of liquefied ethylene were added and the mixture allowed to boil just as in Example I. Four grams of a solution containing 5 parts by weight of aluminum chloride and 95 parts by weight of ethyl chloride were then diluted with 20 gm. of liquid ethylene and added to the solution. The reaction was rapid and a solid polymer having a molecular weight of 108,000 was obtained.

Example IV

To 40 grams of cracked isobutane (once distilled), which contained about 30% of isobutylene, 5% of normal butylene and the balance of isobutane, were added 40 grams of liquefied ethylene. The temperature was maintained at —95° C. and several drops of a 5% solution of aluminum chloride in ethyl chloride and diluted with liquid ethylene were added. The polymer which resulted had a molecular weight of 115,000. Using boron fluoride on the same mixture to be polymerized and at the same temperature, a polymer of 57,000 molecular weight was obtained.

Example V

Ten grams of isobutylene containing 8% of normal butylene were polymerized with 0.1% of a solution of aluminum chloride in ethyl chloride at a temperature of —95° C. The polymer had a molecular weight of 20,000.

When using 0.50% of the catalyst at the same temperature, the molecular weight was 90,000, and when using .65% of the solution the polymer had a molecular weight of approximately 100,000.

Example VI

Isobutylene was polymerized at —78° C. with aluminum chloride which had been dissolved in isopropyl chloride at 0° C. A gummy polymer of 20,000 molecular weight was obtained. Using normal butyl chloride or secondary butyl chloride as the solvent under the same conditions, polymers of about the same molecular weight were also obtained. Better products are obtained at lower temperatures.

Example VII

Isobutylene was polymerized with aluminum chloride dissolved in ethylene dichloride. This catalyst was found to be active at low temperatures, but the polymerization products were lower in molecular weight than those obtained when using methyl or ethyl chloride to dissolve the catalyst under substantially the same conditions.

Example VIII

Isobutylene was polymerized with aluminum chloride dissolved in ethyl bromide and also with a solution of the same metal catalyst in chloroform. These catalysts were found to be active at low temperatures, but the products were lower in molecular weight than those obtained when using methyl or ethyl chloride as the solvent under substantially the same conditions.

Example IX

Isobutylene was polymerized with aluminum chloride dissolved in methyl chloride and also with a solution of the same metal catalyst in chloroform. Methyl chloride was found to dissolve less $AlCl_3$ than ethyl chloride, but gave a polymer of good molecular weight when reacted with isobutylene at —78° C. Chloroform dissolved approximately 2% by weight of $AlCl_3$ and also gave a polymer of relatively good molecular weight (e. g. 30,000) when reacted with isobutylene at —78° C.

Example X

Isobutylene was polymerized with aluminum chloride dissolved in methyl iodide. This catalyst was found to be active at low temperatures, but the product was lower in molecular weight than those obtained using methyl or ethyl chloride under substantially the same conditions.

Example XI

Isobutylene was polymerized with aluminum bromide dissolved in chloroform. This catalyst was found to be active at low temperatures. At —78° C. using powdered solid carbon dioxide as a refrigerant, isobutylene was polymerized to product of approximately 30,000 molecular weight.

The present invention is not to be limited by any theory of the mechanism of the reaction or to any particular metallic halide or solvent therefor, or to any particular olefin or iso-olefin, but only to the following claims in which it is desired to claim all novelty inherent in the process as broadly as the prior art permits.

We claim:

1. In a process for polymerizing iso-olefins at low temperatures below −20° C. to produce polymers of high molecular weight, the step of utilizing as a catalyst a previously prepared solution of a solid halide of the Friedel-Crafts type dissolved in an alkyl halide of less than 5 carbon atoms the said solution being characterized by a freezing point below 20° C. and a concentration of solid halide between 0.1% and 5.0%, prepared at a temperature well below room temperature.

2. Process according to claim 1 in which the halide is one containing less than 5 carbon atoms and containing at least one hydrogen atom.

3. In a process for polymerizing iso-olefins at a temperature below −20° C. to obtain high molecular weight linear polymers, the step of utilizing as a catalyst a previously prepared solution of a solid halide of the Friedel-Crafts type dissolved in an alkyl halide of less than five carbon atoms, the said solution being characterized by a freezing point below −20° C. and a concentration of solid halide between 0.1% and 5%, prepared at a temperature well below room temperature.

4. Process according to claim 3 in which the catalyst is a solution of a metal halide in a lower alkyl mono halide.

5. Process according to claim 3 in which the catalyst is an aluminum chloride halide dissolved in an alkyl mono halide of less than five carbon atoms.

6. Process according to claim 3 in which the catalyst is aluminum chloride dissolved in an alkyl mono halide of less than five carbon atoms.

7. Process according to claim 3 in which the catalyst is aluminum chloride dissolved in ethyl chloride.

8. Process according to claim 3 in which the catalyst is a metal halide dissolved in methyl chloride.

9. Process according to claim 3 in which the catalyst is aluminum chloride dissolved in methyl chloride.

10. Process according to claim 3 in which the catalyst is aluminum halide dissolved in a dihalogen halide.

11. Process according to claim 3 in which the catalyst is aluminum chloride dissolved in ethylene dichloride.

12. In a process for polymerizing olefinic substances, the steps of dissolving a metal halide Friedel-Craft type catalyst in an alkyl halide and adding it to chilled and liquefied olefinic material at a temperature below −50° C., the said alkyl halide comprising a compound having the general formula $R-(Cl)_n$, where R represents an alkyl group having not more than 5 carbon atoms and $n$ is an integer less than 4.

13. The process according to claim 12 in which the metal halide catalyst is aluminum chloride.

ROBERT M. THOMAS.
OBER C. SLOTTERBECK.